United States Patent [19]

Burks

[11] Patent Number: 4,852,227

[45] Date of Patent: Aug. 1, 1989

[54] METHOD FOR MAKING A MULTILAYER CERAMIC CAPACITOR WITH BURIED ELECTRODES AND TERMINATIONS AT A CASTELLATED EDGE

[75] Inventor: Darnall P. Burks, Nashua, N.H.

[73] Assignee: Sprague Electric Company, North Adams, Mass.

[21] Appl. No.: 276,089

[22] Filed: Nov. 25, 1988

[51] Int. Cl.$^4$ .............................................. H01G 7/00
[52] U.S. Cl. .............................. 29/25.42; 29/414; 361/321
[58] Field of Search .................... 29/25.42, 413, 414; 361/321

[56] References Cited

U.S. PATENT DOCUMENTS

| | | | |
|---|---|---|---|
| 3,192,086 | 6/1965 | Gyurk | 156/89 |
| 3,267,342 | 8/1966 | Pratt, Jr. et al. | 361/321 |
| 3,328,865 | 7/1967 | Sperry | 29/25.42 |
| 4,216,523 | 8/1980 | Harford | 29/413 |
| 4,312,026 | 1/1982 | Iwaya et al. | 361/321 |
| 4,419,714 | 12/1983 | Locke | 361/321 |
| 4,430,690 | 2/1984 | Chance et al. | 361/321 |
| 4,661,884 | 4/1987 | Seaman | 361/306 |

FOREIGN PATENT DOCUMENTS

| | | | |
|---|---|---|---|
| 562509 | 5/1957 | Italy | 29/25.42 |
| 868889 | 5/1961 | United Kingdom | 29/25.42 |
| 2032177 | 4/1980 | United Kingdom | 361/321 |

Primary Examiner—P. W. Echols

[57] ABSTRACT

A green-ceramic parent substrate having buried therein a stack of spaced-apart sheet electrodes, each electrode having multiple tab portions extending in one direction to a plane that is orthogonal to the sheet electrodes and to the one direction. A row of holes is drilled between the tabs and through the ceramic in that plane. A plurality of elemental capacitor substrates are cut from the parent substrate, the cutting including dicing through the row of holes so as to leave a castellated edge in each elemental capacitor substrate. The elemental substrates are then fired to maturity and the castellated edge touched to a reservoir of a conductive paste and heated to form spaced apart conductive terminals contacting tabs of the buried electrodes at only the edge castellations.

7 Claims, 1 Drawing Sheet

METHOD FOR MAKING A MULTILAYER CERAMIC CAPACITOR WITH BURIED ELECTRODES AND TERMINATIONS AT A CASTELLATED EDGE

BACKGROUND OF THE INVENTION

This invention relates to a ceramic capacitor with buried electrodes each of which has multiple terminations at high points of a castellated edge of the ceramic body.

A few multilayer ceramic (MLC) capacitor structures are known wherein buried electrodes each having multiple terminations, and when terminations are provided at a castellated edge, the grooves in that edge are commonly filled with metal to serve as the terminations. The process used for providing the terminations involves many sequential steps and is costly in manufacturing.

Castellated edges in ceramic capacitors have heretofore been formed by a variety of methods involving, removal of ceramic material by cutting, abrading, sawing and the like at the edge of a fired ceramic substrate to which buried electrodes extend and at which electrodes terminations are to be provided. It has been suggested, but not implemented, to castellate the fragile edge of a green ceramic substrate. Another method calls for castellating the fragile edge of a green ceramic substrate by embossing it, namely, by pushing a castellating tool into it which displaces but does not remove ceramic material there. This later method would tend to distort the geometry of buried electrode extensions and overall dimensions of the substrate and would be especially difficult to control in the manufacture of miniature capacitors with the likes of 100 mils spacing for multiple terminations at a substrate edge.

It is therefore an object of this invention to provide a simple, reliable method for manufacturing ceramic substrates having buried electrodes that are terminated at a castellated edge.

SUMMARY OF THE INVENTION

The method for making a multilayer ceramic capacitor entails first forming a large parent substrate of the kind having at least two parallel spaced-apart sheet electrodes buried in the ceramic. Each electrode has a plurality of sheet electrode tabs extending in one direction through a plane that is orthogonal to the electrodes.

At least one row of holes is formed in the parent substrate, the center of each hole lying in the above-mentioned plane and between adjacent tabs.

An elemental-capacitor substrate is separated out of the parent substrate. This separating includes dicing in the plane through the row of holes, so that the elemental substrate includes the electrodes and proximal parts of the tabs. The remainder of the tabs are retained in the remaining portion of the parent substrate.

The elemental-capacitor substrate is then heated to sinter the ceramic to maturity.

This invention recognizes that the removal of material in a green ceramic substrate without distorting or breaking away portions of the remaining substrate, is most readily accomplished by forming holes in it, especially by drilling. The subsequent cutting and separating through a row of such holes leaves a castellated edge of uniform and predictable geometry in green ceramic by the simplest and most reliable of methods known heretofore. And such uniform castellated edges, after firing, are reliably and most simply terminated by touching the projected surfaces of the castellations to a reservoir of conductive paste. These non-critical steps are also amenable to mass production.

DESCRIPTION OF THE PREFERRED EMBODIMENTS

Figure 1:
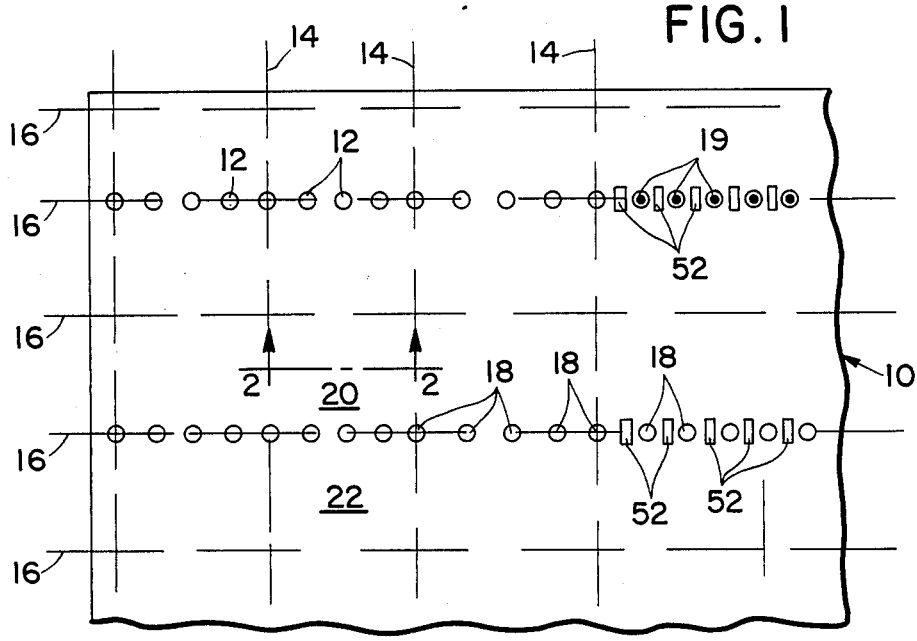
FIG. 1 shows in side view a green ceramic parent substrate of this invention.

In a preferred method a large mother substrate or parent substrate 10 as in FIG. 1 is formed by well-known processes by which a system of mutually parallel spaced apart sheet electrodes are buried in the green ceramic. The electrodes system is such that the parent substrate may be cut apart along vertical (as shown) cutting planes 14 and horizontal cutting planes 16. A row of equally spaced holes 12 and a similar row of equally spaced holes 18 are drilled through the substrate 10 whereby the hole centers 19 lie in one of the horizontal cutting planes 16.

Green ceramic bodies are comprised of a ceramic powder held together by an organic binder. Green bodies therefore always have the compromised qualities of being crumbly, but sticky. Cutting is best done by pressing a razor blade through the green substrate. But upon removal of that dicing blade, the blade-separated parts tend to stick at least partly back together and forced separation of the elemental substrates from the parent tends to result in leaving pieces of one with the other. This problem is greatly ameliorated by freezing the diced parent substrate and then breaking cleanly at the cutting planes. This process is described more fully by Harland et al in U.S. Pat. No. 4,517,144 issued May 14, 1985 and assigned to the same assignee as is the present invention.

Figure 2:
FIG. 2 shows at a magnified scale an end-sectional view of an elemental ceramic-capacitor substrate with one castellated edge having been cut from the parent substrate of FIG. 1.
Figure 3:
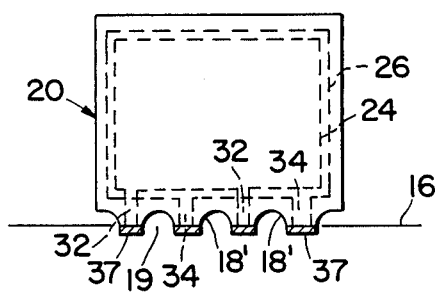
FIG. 3 shows at the magnified scale of FIG. 2, a side view of the elemental ceramic-capacitor substrate of FIG. 2.

Thus the parent substrate 10 is diced up into a number of elemental substrates, e.g. 20 and 22, that were cut from each other through the row of holes 18. Referring to FIGS. 2 and 3, elemental substrate 20 has just two spaced apart and buried electrodes 24 and 26 lying in parallel electrode planes 28 and 30, respectively. Tabs 32 extend from electrode 24 to the cut edge of elemental substrate 20 that lies in the cutting plane 16. Interdigitated with tabs 32 are tabs 34 that extend from electrode 26 also to the edge at cutting plane 16. Grooves 18' in that edge between adjacent tabs have a semicircular shape, having been formed before firing by the dicing through the round drilled holes 18.

The elemental substrate 22, having been cut away from elemental substrate 20 at a cutting plane 16 through the row of holes 18, is essentially identical to substrate 20. In substrate 22 one buried electrode 24' has extending tab portions 32 and a second buried electrode 26' has two tab portions 34. Thus tabs 32 and 34 originally extend from electrodes 26 and 24, respectively, as well as extending from electrodes 26' and 24', respectively. They were shared before dicing but half of each tab portion is retained in each separated elemental substrate after dicing.

Next, the elemental substrates 20 and 22 are fired to maturity, e.g. at a temperature from 1000° C. to 1400° C., as required. Now each elemental substrate has a castellated edge with tabs 32 and 34 extending to the cutting plane 16 at a substrate edge at regular intervals, with semicircular grooves between the ceramic castellations containing the tabs.

A separate termination 37 is now formed at the surface of each ceramic castellation making electrical contact with tabs 32 or 34 contained therein. This is accomplished in a very simple and reliable way by simultaneously dipping the outer edge of all castellations of each elemental substrate into a pool of conductive paste, removing and heating the substrate to cure the conductive paste termination. Many elemental substrates may be stacked or arrayed and so dipped at the same time and, of course, all substrates may be simultaneously heated for curing the terminations.

An equally efficient means for providing terminations 37 includes rolling a hard cylindrical roller coated with the conductive paste over the castellated surface of one or more elemental substrates wherein those surfaces of all substrates are held in the same plane. Heating to cure can be effected as before.

Figure 5:
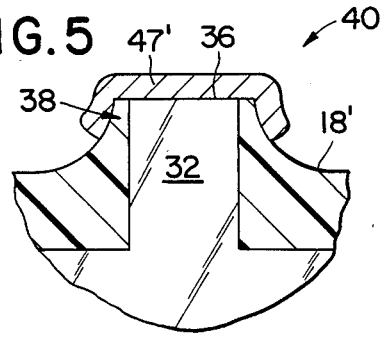
FIG. 5 shows in side sectional view the further magnified detail 40 of FIG. 4 having an alternate terminal construction.

Depending on how deeply the substrate edges are dipped or how thick the coating of paste on the roller, each metal termination 47 may extend from each castellation edge surface 36 and partially into the semicircular groove forming the side wall of the castellation 38 as shown in the detail 40 of FIG. 5. This leads to more strongly bonded terminations, and without the threat of shorting adjacent terminations by protective intervening grooves 18'.

In a second preferred embodiment, additional rows of holes are drilled in all horizontal planes 16. Each elemental substrate 42 as seen in FIG. 6 has two tabs, e.g. 44, extending from each electrode, e.g. 48, at opposite castellated edges.

Both elemental capacitor substrates 20 and 42 (FIGS. 3 and 6, respectively) are particularly suitable for use at high frequencies wherein the leads and terminals arrangement has a very low inductance. This is effected by providing a multiple system of tabs and corresponding terminals connecting to each electrode and especially by interdigitated tabs (and terminals) from separate electrodes at at least one edge of the capacitor substrate.

Figure 6:
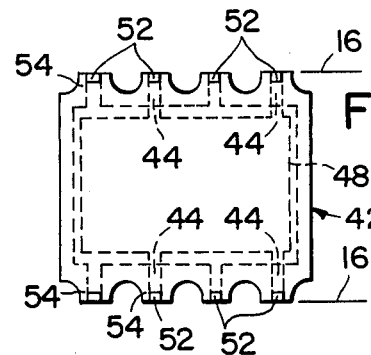
FIG. 6 shows in side view another elemental capacitor substrate of this invention having two castellated edges.
Figure 4:
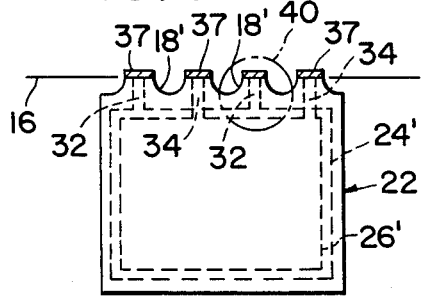
FIG. 4 shows at the scale of FIG. 2 a side view of another ceramic-capacitor substrate, having been cut from an adjacent part of the parent substrate of FIG. 1.

The capacitor substrate 42 of FIG. 6 has the added advantage at high frequencies of permitting a "four terminal" connection in a through pass circuit application wherein high frequencies are to be shunted in differential mode but passed in common mode.

The capacitor substrate of FIG. 6 also illustrates the result of a further improvement in the method of making such capacitor substrates according to this invention. A rectangular film of metal 52 is located on the outer side surface of substrate 41 in registration with and near the outer edge of each ceramic castellation 54. These films 52 were first deposited as an electrode ink pattern put down in the last of the sequential screening steps performed by the screening machine that has a provision for registering successive buried electrode patterns with each other.

In the drilling step to follow, holes are registered between the buried tab 44 by visual observation of the dummy tabs 52 on the outside ceramic surface. Those dummy tabs 52 have the further advantage that terminal metal may adhere better to these outer films 52 than to bare ceramic, additionally enhancing their strength of attachment.

Capacitors of this invention, castellated edges at which spaced-apart terminals lie in one plane, are particularly well suited for direct connection to the planar wiring on printed circuit boards. Alternatively, a metal strip or wire lead may be soldered or otherwise conductively connected to each castellated terminal. Such leads, rather than be simply flush attached, would preferably have one end formed in the shape of a cup and attached by inserting a castellation/terminal into the cup prior to bonding, e.g. by reflow soldering. The leads may extend from the capacitor body in a direction parallel to the two major faces of the capacitor body or alternatively at right angles to it. In parallel-direction construction, the lead end having the cup shape could have the appearance of an S, of which one loop is the cup and the other loop being flattened and extending away from the body in the parallel direction.

What is claimed is:

1. In a method for making a multilayer ceramic capacitor including forming a green ceramic parent substrate with a stack of mutually parallel spaced-apart sheet electrodes buried therein, each of one group of said electrodes having a plurality of tab portions extending in one direction through one plane orthogonal to said electrodes, the improvement comprising:

forming one row of holes in said green parent substrate, the center of each hole lying in said one plane between adjacent tab portions;

separating a green elemental substrate from said green parent substrate by dicing in said plane through said row of holes, said elemental substrate including said electrodes and proximal parts of said tab portions, the remainder of said parent substrate including the distal parts of said tab portions; and heating and sintering said elemental substrate.

2. The method of claim 1 wherein said forming of said holes is accomplished by drilling.

3. The method of claim 1 wherein one castellated end of said elemental substrate is created by said dicing through said holes, said tab portions extending to said end only at castellations respectively therein, and additionally comprising applying a layer of a conductive paste to said end selectively at said castellations.

4. The method of claim 3 wherein said applying selectively is accomplished by dipping said elemental-substrate-end in a pool of said conductive paste.

5. The method of claim 3 wherein said applying selectively is accomplished by rolling said end employing a cylindrical roller coated with said conductive paste.

6. The method of claim 1 wherein said forming said parent substrate includes sequentially building a stack of green ceramic layers including screen printing on a top surface of some of said layers conductive patterns that become buried electrodes, said forming said parent substrate additionally including screen printing a pattern of ink patches at said plane registered with and on top of said tabs, and said forming said holes including drilling in said plane between said visible patches.

7. The method of claim 1, wherein each of said one group electrodes additionally has a multiplicity of tab portions extending in the opposite direction through another plane that is also orthogonal to said electrodes and is parallel to said one plane, additionally comprising forming another row of holes in said green parent substrate, the center of each hole lying in said one plane between the adjacent of said multiplicity of tab portions; and said separating additionally including dicing through said another row of holes so that said separated elemental substrate has two opposite castelllated edges with said electrode tab portions extending within castellations of both of said edges to said opposite edges.

* * * * *